(12) United States Patent
Padera et al.

(10) Patent No.: US 12,024,281 B2
(45) Date of Patent: Jul. 2, 2024

(54) AUTOMATED COLLISION AVOIDANCE METHODS AND SYSTEMS

(71) Applicant: HONEYWELL INTERNATIONAL INC., Charlotte, NC (US)

(72) Inventors: Zdenek Padera, Brno (CZ); Jan Frank, Hustopece (CZ); Luis Melendez, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 759 days.

(21) Appl. No.: 17/064,004

(22) Filed: Oct. 6, 2020

(65) Prior Publication Data

US 2022/0106037 A1    Apr. 7, 2022

(51) Int. Cl.
| | | |
|---|---|---|
| *B64C 39/02* | (2023.01) | |
| *G05D 1/00* | (2006.01) | |
| *G08G 5/00* | (2006.01) | |
| *G08G 5/04* | (2006.01) | |

(52) U.S. Cl.
CPC ......... *B64C 39/024* (2013.01); *G05D 1/0088* (2013.01); *G05D 1/106* (2019.05); *G08G 5/0039* (2013.01); *G08G 5/04* (2013.01); *B64U 2201/10* (2023.01)

(58) Field of Classification Search
None
See application file for complete search history.

(56) References Cited

U.S. PATENT DOCUMENTS

| | | |
|---|---|---|
| 6,646,588 B2 | 11/2003 | Tran |
| 9,199,724 B2 | 12/2015 | Pastor |
| 9,870,000 B2 | 1/2018 | Stange |
| 9,904,291 B2 | 2/2018 | Lanterna et al. |
| 10,049,590 B2 | 8/2018 | Thiele et al. |
| 2010/0292871 A1 | 11/2010 | Schultz et al. |

(Continued)

OTHER PUBLICATIONS

Scheff, Scott, "Automated Collision Avoidance (ACA) and Automated Return to Course (ARTC) Requirement and Guidance Review Final," NASA/CR-2019-220156, Nov. 2018.

(Continued)

*Primary Examiner* — Aniss Chad
*Assistant Examiner* — Mahmoud M Kazimi
(74) *Attorney, Agent, or Firm* — Lorenz & Kopf LLP (57) ABSTRACT

Methods and systems are provided for autonomous vehicle operation for collision avoidance. One method involves identifying an autonomous operating mode and one or more settings associated with the autonomous operating mode prior to entering an autonomous collision avoidance mode in response to an output from a collision avoidance system, and after entering the autonomous collision avoidance mode, automatically restoring autonomous operation upon deactivation of the autonomous collision avoidance mode. For example, the autonomous operating mode may be automatically reinitiated based on the current vehicle status using the one or more settings in response to deactivation of the autonomous collision avoidance mode when it is determined that the autonomous operating mode is viable based on a relationship between a current vehicle status and the one or more settings associated with the autonomous operating mode.

19 Claims, 6 Drawing Sheets

(56) References Cited

U.S. PATENT DOCUMENTS

2012/0253555 A1* 10/2012 Stange ................ G08G 5/0056
701/3
2016/0240091 A1* 8/2016 Thiele ................. G08G 5/0056
2018/0018885 A1 1/2018 Khatwa et al.
2019/0114932 A1 4/2019 Khatwa et al.
2019/0189017 A1* 6/2019 Nicholls ............. G08G 5/0078

OTHER PUBLICATIONS

Traffic Collision Avoidance System (TCAS) or Airborne Collision Avoidance System (ACAS) Apr. 1, 2020, https://www.320memoryitems.com/post/_tcas downloaded on Jul. 6, 2020.
Botargues, Paule, "Airbus AP/FD TCAS Mode: A New Step Towards Safety Improvement," Hindsight No. 6, Jan. 2008, downloaded from https://www.skybrary.aero/bookshelf/books/90.pdf on Jul. 6, 2020.
Ifalpa, Automatic Airborne Collision Avoidance Systems (Auto ACAS), Mar. 4, 2014, downloaded from https://ifalpa.org/media/2089/14pos29-automatic-airborne-collision-avoidance-systems-auto-acas.pdf on Jul. 6, 2020.
Lemonincider, "Is Auto Pilot Capable of Performing TCAS Resolution Advisory," Oct. 17, 2017, downloaded from https://aviation.stackexchange.com/questions/44805/is-auto-pilot-capable-of-performing-tcas-resolution-advisory on Jul. 6, 2020.
European Office Action from Application No. 21200603.5 dated Nov. 15, 2023.

\* cited by examiner

AUTOMATED COLLISION AVOIDANCE METHODS AND SYSTEMS

TECHNICAL FIELD

The subject matter described herein relates generally to vehicle systems, and more particularly, embodiments of the subject matter relate to aircraft systems capable of restoring autonomous operation after performing automated collision avoidance.

BACKGROUND

Many modern aircraft are equipped with collision avoidance systems, such as an Airborne Collision Avoidance System (ACAS) or a Traffic Alert and Collision Avoidance System (TCAS). Such systems use a generally adopted standard for monitoring the space around a host aircraft and detecting neighbor traffic. When neighboring traffic enters (or is expected to enter) a buffer zone around the host aircraft, the collision avoidance system issues an alert that an evasive maneuver should be performed. For example, a Resolution Advisory (RA) is a TCAS alert that directs the pilots how to regulate or adjust their vertical situation so as to avoid a collision. To achieve the intended safety benefits, pilots must respond to the RAs; however, RAs often provide very little time to respond and tend to occur in an area of high cognitive demand, such as congested terminal areas.

Various autopilot-coupled TCAS systems have been proposed to enable the autopilot to automatically fly TCAS RA maneuvers per the existing TCAS functionality, and thereby reduce delayed or incorrect RA responses, resulting in an overall increase in safety. However, upon clearance of a potential collision threat, pilot action is often required to restore the desired operation of the aircraft, thereby increasing the pilot workload and potentially decreasing situational awareness. Accordingly, it is desirable to reduce the workload of the pilot and provide improved situational awareness upon termination of collision avoidance automation.

BRIEF SUMMARY

Methods and systems are provided for assisting operation of a vehicle, such as an aircraft. A method for autonomously operating a vehicle involves identifying an autonomous operating mode and one or more settings associated with the autonomous operating mode prior to entering an autonomous collision avoidance mode in response to an output from a collision avoidance system, after entering the autonomous collision avoidance mode, determining whether the autonomous operating mode is viable based on a relationship between a current vehicle status and the one or more settings associated with the autonomous operating mode, and when the autonomous operating mode is viable, automatically reinitiating the autonomous operating mode based on the current vehicle status using the one or more settings in response to deactivation of the autonomous collision avoidance mode.

In another embodiment, a flight control method for autonomous operation of an aircraft is provided. The method involves autonomously operating, by a flight control system, the aircraft in a first autonomous operating mode in accordance with one or more flight path targets, receiving, by the flight control system, an output from a collision avoidance system indicative of an evasive maneuver, in response to the output, autonomously operating, by the flight control system, the aircraft in autonomous collision avoidance mode in accordance with the output from the collision avoidance system in lieu of the first autonomous operating mode, verifying the first autonomous operating mode is viable based at least in part on a current aircraft status with respect to the one or more flight path targets while the aircraft is autonomously operated in the autonomous collision avoidance mode, and in response to deactivation of the autonomous collision avoidance mode when the first autonomous operating mode is viable, reinitiating the first autonomous operating mode based at least in part on the current aircraft status and the one or more flight path targets prior to the flight control system autonomously operating the aircraft in the first autonomous operating mode.

In another embodiment, an aircraft system is provided. The aircraft system includes a flight management system to determine a vertical profile for an aircraft using one or more flight path targets and a flight control system coupled to the flight management system to autonomously operate the aircraft in accordance with the vertical profile in an original autonomous operating mode, autonomously operate the aircraft in accordance with an autonomous collision avoidance mode independent of the vertical profile in response to an output from a collision avoidance system, and thereafter, in response to deactivation of the autonomous collision avoidance mode, autonomously operate the aircraft in accordance with the original autonomous operating mode based at least in part on a current aircraft status utilizing the one or more flight path targets.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein generally relate to systems and methods for restoring autonomous operation after collision avoidance automation. While the subject matter described herein could be utilized in various applications or in the context of various types of vehicles (e.g., automobiles, marine vessels, trains, or the like), exemplary embodiments are described herein in the context of an aircraft. In particular, the subject matter is described primarily in the context of a piloted or manned aircraft, although it should be appreciated the subject matter can be implemented in an equivalent manner for unmanned aerial vehicles, urban air mobility vehicles, helicopters, rotorcraft, and the like.

In exemplary embodiments, in response to a resolution advisory (RA) or other indicia of a potential collision threat or intruder from a collision avoidance system, an automated flight control system enters into an autonomous collision avoidance mode, alternatively referred to herein as an autopilot-coupled traffic and collision avoidance system (AP TCAS) mode, where the automated flight control system automatically and autonomously executes a recommended evasive maneuver provided by the collision avoidance system. For example, as described in U.S. Patent Application Publication No. 2019/0114932, depending on whether the recommended evasive maneuver is a preventative RA or corrective RA, the automated flight control system autonomously operates the aircraft to either maintain the vertical speed of the aircraft within a targeted range of permissible vertical speeds indicated by a preventative RA or adjust the vertical speed to achieve a targeted vertical speed indicated by a corrective RA.

As described in greater detail below, in exemplary embodiments, in response to receiving a resolution advisory, the original autonomous operating mode currently being implemented or executed is recorded, logged, or otherwise maintained prior to activation of the autonomous collision avoidance mode at the time of the resolution advisory, along with the current values for one or more flight path targets or other parameters or settings associated with the current autonomous operating mode that dictate or otherwise influence the behavior of the autonomous operating mode (e.g., one or more flight path angle targets or constraints, one or more altitude targets or constraints, one or more vertical speed targets or constraints, and/or the like). While the AP TCAS mode is active, whether the preceding autonomous operating mode is viable for reentry or reinitiation is continually and dynamically determined based on the relationship between the current, real-time status of the aircraft and the initial values for the flight path targets, parameters or settings associated with the original autonomous operating mode by applying mode reentry logic associated with the original autonomous operating mode. In this regard, the logic and criteria utilized to determine whether or not a particular autonomous operating mode remains viable is mode-specific and varies depending on the original autonomous operating mode. In some embodiments, when the original autonomous operating mode is viable, a graphical indication that identifies the original autonomous operating mode as being armed for reentry upon exiting the AP TCAS mode is provided to inform the pilot and improve situational awareness in advance of the AP TCAS mode terminating.

When the original autonomous operating mode is no longer viable, the viability of an alternative autonomous operating mode is determined based on the relationship between the current, real-time status of the aircraft and the initial values for the parameters or settings associated with the original autonomous operating mode by applying mode entry logic associated with the alternative autonomous operating mode. In this regard, the initial values for the flight path targets, parameters or settings associated with the original autonomous operating mode may influence the subsequent availability of the alternative autonomous operating mode. When the alternative autonomous operating mode is viable, a graphical indication that identifies the alternative autonomous operating mode as being armed for entry upon exiting the AP TCAS mode is provided to inform the pilot of the anticipated change in automation behavior in advance of the AP TCAS mode terminating. Conversely, when the alternative autonomous operating mode is not viable, a default autonomous operating mode may be identified for entry upon exiting the AP TCAS mode. In this regard, the graphical indication of the expected or anticipated autonomous operating mode upon exiting the AP TCAS mode may dynamically vary or change throughout the duration of the AP TCAS mode substantially in real-time as the aircraft status (e.g., altitude, speed, location, flight phase, and/or the like) changes with respect to the original autonomous operating mode settings and influences the viable autonomous mode transitions.

When the collision avoidance system removes the RA and/or provides a clear of conflict or other indication that the collision avoidance maneuver can be terminated, the automated flight control system automatically exits the AP TCAS mode and automatically enters into the autonomous operating mode selected for entry. In this regard, when the original autonomous operating mode is viable and selected for reentry, the automated flight control system may automatically reinitiate the original autonomous operating mode using one or more of the original autonomous operating mode settings. As a result, the reinitiated instance of the original autonomous operating mode may exhibit behavior similar to the preceding instance of the original autonomous operating mode prior to entering the AP TCAS mode. Alternatively, in scenarios where an alternative operating mode has been identified, the automated flight control system automatically initializes the alternative autonomous operating mode using one or more of the original autonomous operating mode settings. In this regard, the alternative autonomous operating mode may approximate or otherwise imitate the performance of the original autonomous operating mode prior to entering the AP TCAS mode in one or more aspects by using one or more of the original autonomous operating mode settings. Otherwise, when neither the initial nor alternative autonomous operating modes are viable, the automated flight control system transitions from the AP TCAS mode to a default mode with a corresponding graphical indication provided to the pilot to apprise the pilot of additional actions that may be required to reenter the original autonomous operating mode.

By facilitating transitioning from the AP TCAS mode back into the preceding autonomous operating mode or an alternative autonomous operating mode that exhibits at least some common behavior or performance similar to the preceding autonomous operating mode, the pilot workload upon termination of the AP TCAS mode is reduced, which also reduces the potential for human error. Additionally, restoration of the original autonomous operating mode or an alternative autonomous operating mode that approximates the behavior or performance of the original autonomous operating mode reduces deviation from the originally planned flight path, which, in turn may reduce fuel consumption or other costs.

Figure 1:
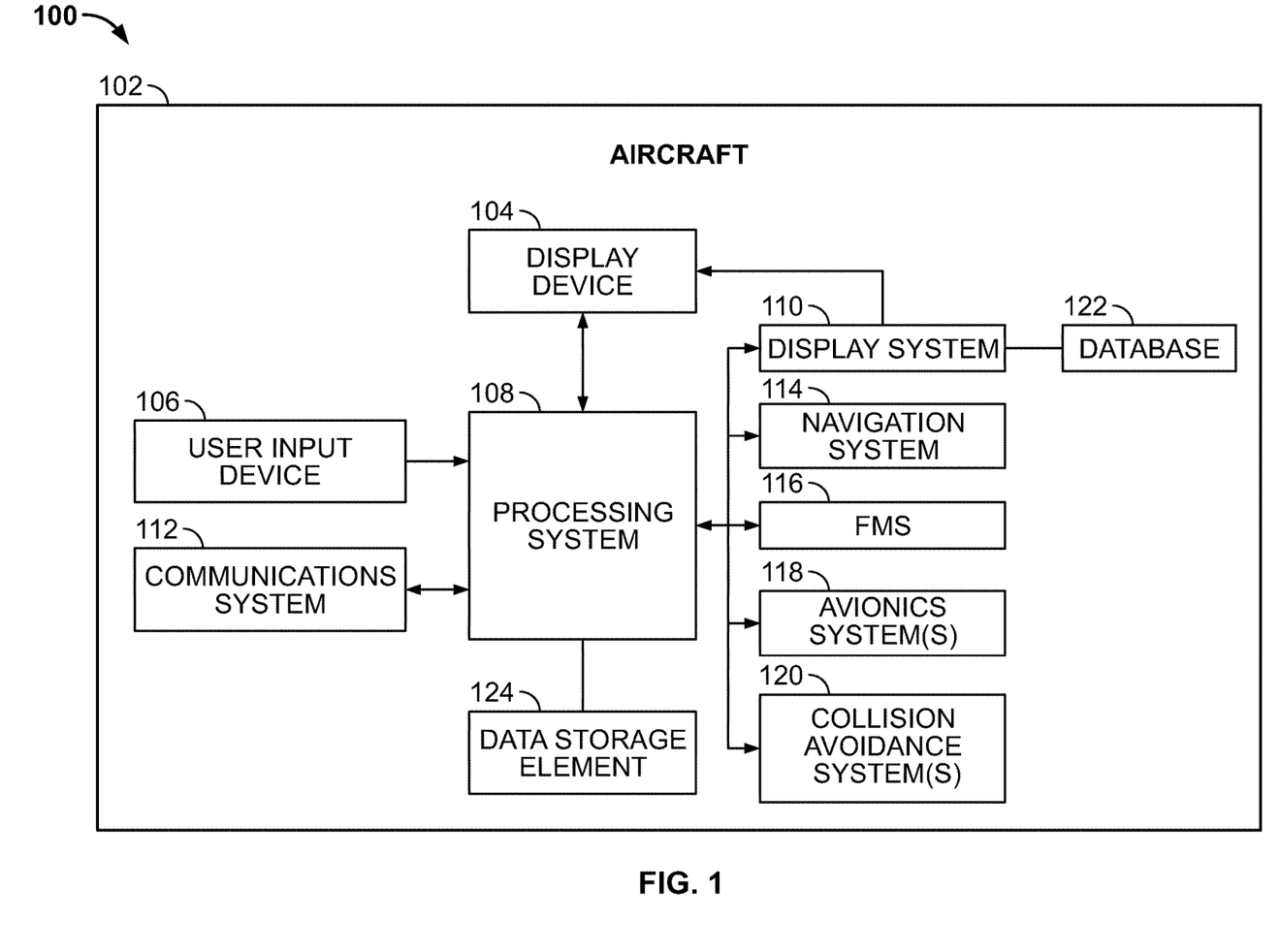
FIG. 1 is a block diagram of a system for an aircraft in one or more exemplary embodiments.

FIG. 1 depicts an exemplary embodiment of a system 100 which may be located onboard a vehicle, such as an aircraft 102. The system 100 includes, without limitation, a display device 104, a user input device 106, a processing system 108, a display system 110, a communications system 112, a navigation system 114, a flight management system (FMS) 116, one or more avionics systems 118, a collision avoidance system 120, and one or more data storage elements 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, and the processing system 108 and the display system 110 are cooperatively configured to display, render, or otherwise convey one or more graphical representations or images associated with operation of the aircraft 102 on the display device 104, as described in greater detail below.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map. In one or more exemplary embodiments, the display system 110 accesses a synthetic vision terrain database 122 that includes positional (e.g., latitude and longitude), altitudinal, and other attribute information (e.g., terrain type information, such as water, land area, or the like) for the terrain, obstacles, and other features to support rendering a three-dimensional conformal synthetic perspective view of the terrain proximate the aircraft 102.

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference). Additionally, in an exemplary embodiment, the navigation system 114 includes inertial reference sensors capable of obtaining or otherwise determining the attitude or orientation (e.g., the pitch, roll, and yaw, heading) of the aircraft 102 relative to earth.

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, detection systems, an electronic flight bag and/or another suitable avionics system.

Still referring to FIG. 1, the collision avoidance system 120 generally represents the component(s) of the aircraft 102 that are coupled to one or more of the other onboard systems 108, 110, 112, 114, 116, 118 to detect incoming aircraft on a potentially conflicting flight path and generate or otherwise provide corresponding alerts to other onboard systems 108, 110, 112, 114, 116, 118. In this regard, the collision avoidance system 120 generally includes air traffic detection hardware, such as, for example, one or more antennas, transponders, interrogators, radar, and/or the like that support identification and detection of other aircraft within a vicinity of the aircraft 102 substantially in real-time. In some embodiments, the collision avoidance system 120 may also measure, sense, or otherwise detect obstacles, terrain and/or the like in the vicinity of the aircraft 102, while other embodiments may rely on a separate terrain avoidance system (e.g., a Terrain Awareness and Warning System (TAWS), an Enhanced Ground Proximity Warning System (EGPWS), or the like).

In addition to detection hardware to provide real-time detection data, in exemplary embodiments, the collision avoidance system 120 also includes collision avoidance hardware, firmware, processing logic and/or other components configured to analyze the detection data to identify or otherwise determine a recommended evasive maneuver (or resolution advisory) for the aircraft 102 to avoid a potential collision and output or otherwise provide indication of the recommended evasive maneuver to another onboard system 108, 110, 112, 114, 116, 118. For example, the collision avoidance system 120 may determine a recommended vertical speed at which the aircraft 102 should increase or decrease altitude to avoid a potential collision. In one or more exemplary embodiments, the collision avoidance system 120 satisfies the Traffic Alert and Collision Avoidance System (TCAS) minimum operational performance standards (MOPS) promulgated by the Federal Aviation Administration (FAA) or other governmental or regulatory body. Accordingly, for purposes of explanation, but without limitation, the collision avoidance system 120 may alternatively be referred to herein using the acronym TCAS. Various examples of a collision avoidance system 120 outputting or otherwise providing indication of a resolution advisory to another onboard system 108, 110, 112, 114, 116, 118 are described in greater detail in U.S. Patent Publication No. 2019/0189017.

In one or more embodiments, the collision avoidance system 120 generates or otherwise provides a recommended evasive maneuver (or resolution advisory) when a projected trajectory of the aircraft 102 intersects, or comes within a threshold distance of intersecting, a projected trajectory of another aircraft detected in a vicinity of the aircraft 102. For example, based on the current heading, location, altitude and/or speed of an intruder aircraft detected in the vicinity of the aircraft 102, the collision avoidance system 120 may calculate or otherwise determine a projected trajectory for the intruder aircraft. Similarly, the collision avoidance system 120 may utilize the current aircraft heading, location, altitude and/or speed to determine a projected trajectory for the ownship aircraft 102. When the projected trajectories intersect or come within a threshold distance of one another in advance of the current location of the aircraft 102, the collision avoidance system 120 may identify a potential collision threat and determine an adjustment for the ownship aircraft 102 that alters the projected ownship trajectory such that the projected trajectories do not come within a threshold distance of one another in advance of the current aircraft location.

In the illustrated embodiment, the processing system 108 is also coupled to the communications system 112, which is configured to support communications to and/or from the aircraft 102 via a communications network. For example, the communications system 112 may support communications between the aircraft 102 and one or more external monitoring systems, air traffic control, and/or another command center or ground location. In some embodiments, the communications system 112 may allow the aircraft 102 to receive collision avoidance information from another system that is external to the aircraft 102, such as, for example, from another neighboring aircraft, a ground-based system in a terminal area or other airspace the aircraft 102 is currently operating within, and/or the like. Thus, the subject matter described herein may be implemented in embodiments where a collision avoidance system may not be present onboard the aircraft 102 but reside at a remote or external location and communicate with the aircraft 102 via the communications system 112.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, various features and/or functionality of processing system 108 described herein (or a subset of features and/or functionality described in the context of the processing system 108) can be implemented by or otherwise integrated with the features and/or functionality provided by the display system 110, the FMS 116 and/or another onboard avionics system 118 (e.g., flight control system), or vice versa. In other words, some embodiments may integrate the processing system 108 with the display system 110, the FMS 116 or another onboard avionics system 118; that is, the processing system 108 may be a component of the display system 110, the FMS 116 or another onboard avionics system 118.

Figure 2:
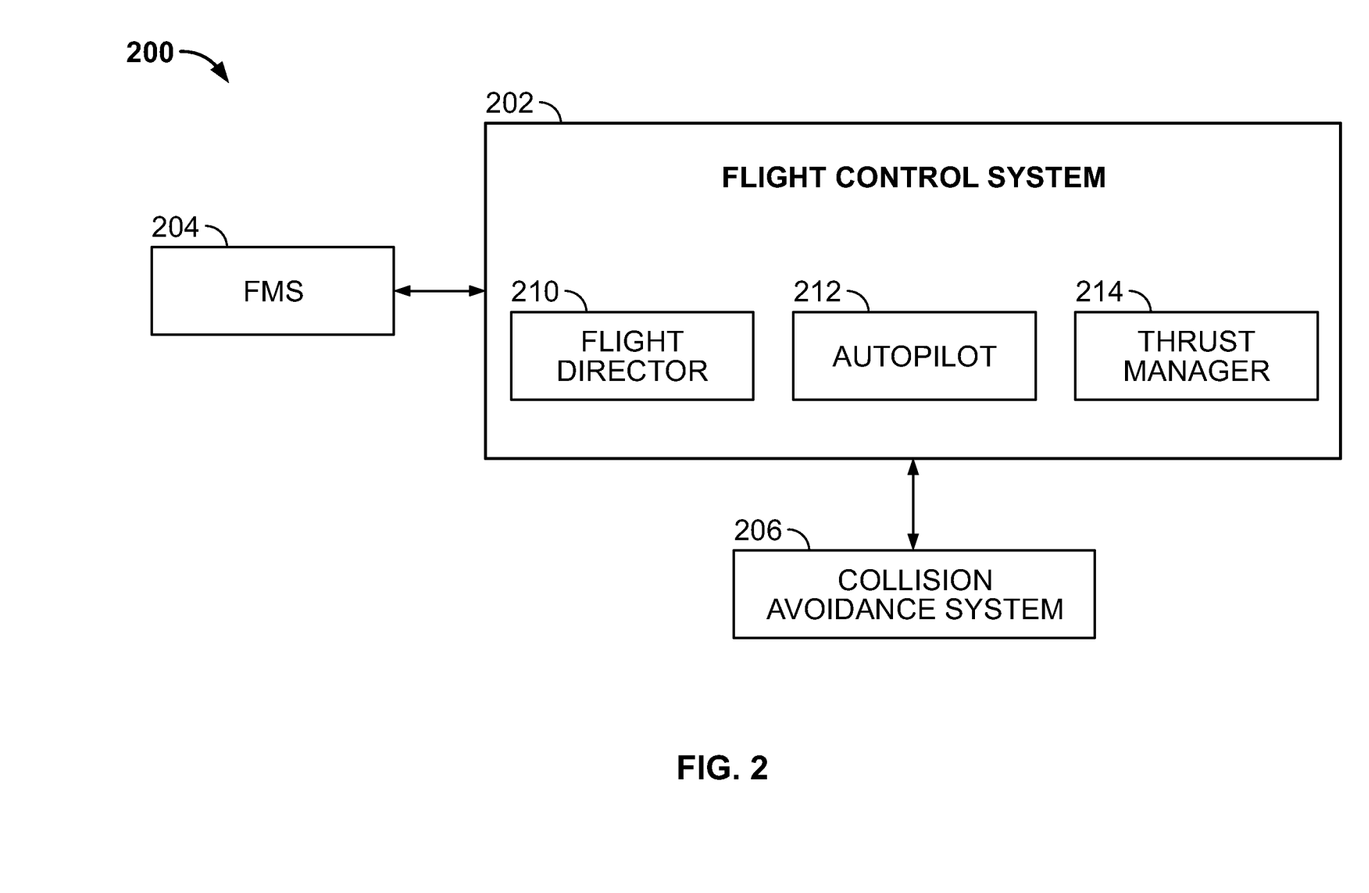
FIG. 2 is a block diagram of an autonomous control system suitable for use with the aircraft of FIG. 1 in one or more exemplary embodiments.

FIG. 2 depicts an exemplary embodiment of an autonomous control system 200 suitable for use with an aircraft, such as aircraft 102 of FIG. 1. The illustrated autonomous control system 200 includes, without limitation, a flight control system (FCS) 202 (e.g., avionics system 118), a FMS 204 (e.g., FMS 116), and a collision avoidance system (TCAS) 206 (e.g., collision avoidance system 120). While FIG. 2 depicts an implementation where the FCS 202, the FMS 204, and the TCAS 206 are realized using separate line replaceable units (LRUs), in practice, the features and/or functionality of the systems 202, 204, 206 described in the context of FIG. 2 can be implemented by or otherwise integrated using additional or fewer LRUs, for example, by integrating the features and/or functionality of the FMS 204 and the FCS 202 in a common LRU.

Referring to FIG. 2 with reference to FIG. 1, the FMS 116, 204 generally represents the component of the autonomous control system 200 onboard an aircraft 102 that is configured to receive or otherwise obtain a flight plan for the aircraft 102 and utilize the flight plan and other criteria or constraints to generate commands, instructions, or other guidance for autonomously operating the aircraft 102 in accordance with an autonomous operating mode that is designated or otherwise selected by a pilot or other user. For example, the FMS 116, 204 calculates or otherwise determines a flight path for the aircraft 102 based on the flight plan using aircraft performance predictions, environmental factors, and other constraints or criteria, such as, for example, speed constraints, altitude constraints, and the like. In this regard, an altitude constraint be entered manually by the pilot or may be coded as part of a procedure to be flown as part of the flight plan, and the altitude constraint defines a window that the aircraft 102 may pass through vertically while traveling the lateral trajectory. The FMS 116, 204 constructs a vertical profile that satisfies the relevant constraints, and then outputs or otherwise provides commands or other indicia of the vertical profile to be flown to the FCS 118, 202 for implementation. In conjunction with the vertical profile, the FMS 116, 204 may also calculate or otherwise determine a speed profile that satisfies any relevant speed constraints and achieves a desired aircraft performance (e.g., an input cost index value).

Referring to FIG. 2, in exemplary embodiments, the FCS 202 includes a flight director 210, an autopilot system (or autopilot) 212, and a thrust management system (or thrust manager) 214. The flight director 210 generally represents a process, service, software or firmware component that is executed, generated or otherwise implemented by the FCS 202 to autonomously command or otherwise control operation of the autopilot 212 and the thrust manager 214 in accordance with an autonomous operating mode that has been selected or otherwise activated. In this regard, the autopilot 212 generally represents the process, service, software or firmware component that is executed, generated or otherwise implemented by the FCS 202 to autonomously command or otherwise control operation of the flight control surfaces of the aircraft 102 to regulate the pitch and roll of the aircraft 102, and the thrust manager 214 generally represents the process, service, software or firmware component that is executed, generated or otherwise implemented by the FCS 202 to autonomously command or otherwise control operation of the engines to regulate the speed or thrust produced. For example, when a vertical navigation (VNAV) autonomous operating mode is selected or otherwise activated, the flight director 210 utilizes the vertical profile provided by the FMS 116, 204 to generate corresponding commands or instructions for the autopilot 212 and the thrust manager 214 to autonomously operate the aircraft 102 in accordance with the vertical profile provided by the FMS 116, 204, thereby satisfying any applicable altitude constraints, speed constraints, or other criteria or conditions of the flight plan. Conversely, when the FCS 202 and/or the flight director 210 is configured such that a vertical speed (VS) autonomous operating mode is selected or active, the flight director 210 commands or otherwise instructs the autopilot 212 and the thrust manager 214 to vary the pitch and/or thrust of the aircraft 102 to maintain a desired vertical speed, independent of any vertical profile or other vertical guidance or constraints output by the FMS 116, 204. It should be noted that there are numerous different autonomous operating modes that may be supported by the FCS 202 and/or the flight director 210, and the subject matter described herein is not limited to any particular type, number, or combination of autonomous operating modes that may be supported. Additionally, in practice, the commands generated by the flight director 210 may be displayed or otherwise presented on a display device (e.g., display device 104) to assist a pilot manually flying the aircraft without necessarily requiring autonomous operation.

Still referring to FIG. 2, in exemplary embodiments, the FCS 202 and/or the flight director 210 is coupled to the TCAS 120, 206 to receive resolution advisories (RA) output by the TCAS 120, 206 and automatically activate an autopilot-coupled traffic and collision avoidance system (AP TCAS) autonomous operating mode, where the flight director 210 autonomously commands or otherwise instructs the autopilot 212 and the thrust manager 214 to vary the pitch and/or thrust of the aircraft 102 to execute a RA provided by the TCAS 120, 206. In this regard, a RA provided by the TCAS 120, 206 may cause the FCS 202 and/or the flight director 210 to automatically and autonomously exit an autonomous operating mode that was previously active and enter the AP TCAS mode while the RA persists or is otherwise active.

Figure 3:
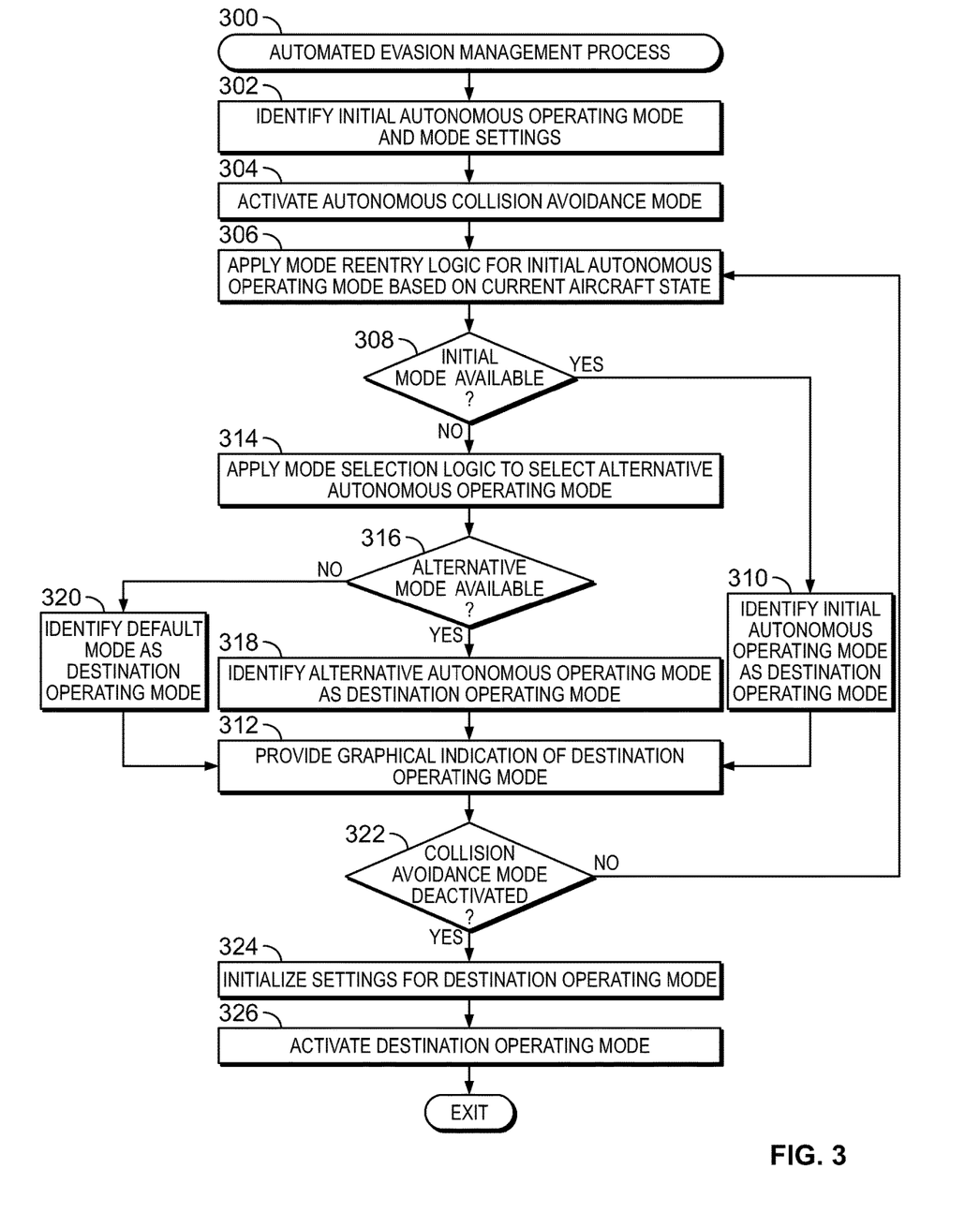
FIG. 3 is a flow diagram of an exemplary automated evasion management process suitable for use with the autonomous control system of FIG. 2 or the aircraft in the system of FIG. 1 in accordance with one or more embodiments.

Referring now to FIG. 3, in an exemplary embodiment, the aircraft system 100 is configured to support an automated evasion management process 300 to automatically transition to and from autonomous operating modes in order to autonomously perform an evasive maneuver before reverting to autonomous operation. The various tasks, functions, and operations described below as being performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the automated evasion management process 300 may be performed by different elements of an aircraft system 100 or an autonomous control system 200, such as, for example, the processing system 108, the display system 110, the communications system 112, the navigation system 114, the FMS 116, 204, the collision avoidance system 120, 206, the FCS 202 and/or other onboard avionics system(s) 118. It should be appreciated that the automated evasion management process 300 may include any number of additional or alternative tasks, the tasks may be performed in a different order and/or the tasks may be performed concurrently, and/or the automated evasion management process 300 may be incorporated into a more comprehensive procedure or process having additional functionality not described in detail herein. Moreover, one or more of the tasks shown and described in the context of FIG. 3 could be omitted from a practical embodiment of the automated evasion management process 300 as long as the intended overall functionality remains intact.

Referring to FIG. 3, and with continued reference to FIGS. 1-2, in exemplary embodiments, the illustrated automated evasion management process 300 initializes or otherwise begins in response to receiving or otherwise obtaining an output from a collision avoidance system indicative of a need for potential action to avoid a collision. For example, as described above, the collision avoidance system 120, 206 generates or otherwise provides an alert or other output when a potential collision threat is detected within a vicinity of the aircraft 102. In one or more exemplary embodiments, the alert output by the collision avoidance system 120, 206 is realized as a resolution advisory that indicates a recommended evasive maneuver for the aircraft 102 to execute to mitigate and resolve any potential collision threat(s). For example, a collision avoidance system 120, 206 compliant with TCAS operational performance standards may output a resolution advisory that includes vertical guidance that depends on the spatial relationships of the potential collision threat(s). The vertical guidance generally includes indicia of whether the aircraft 102 should ascend or descend in altitude, and if so, a recommended vertical speed for ascending or descending. The vertical guidance provided by the TCAS 120, 206 is utilized by the flight director 210 of the automated flight control system 118, 202 to implement an AP TCAS autonomously operating mode that autonomously operates the autopilot 212 and thrust manager 214 to execute or otherwise perform an evasive maneuver corresponding to the RA.

Prior to activating an autonomous collision avoidance mode, the automated evasion management process 300 identifies or otherwise obtains the original autonomous operating mode currently active and its associated settings that dictate autonomous operation (task 302). In this regard, the active autonomous operating mode that was currently being implemented by the flight director 210 or FCS 202 when a corrective RA is provided by the TCAS 120, 206 may be logged, recorded, or otherwise stored by the automated evasion management process 300 (e.g., by the processing system 108, the FMS 116, 204, and/or the FCS 118, 202 storing an indication of the active autonomous operating mode). Additionally, the automated evasion management process 300 stores or otherwise maintains any constraints, conditions, or other criteria or parameter values that were being utilized by the flight director 210 or FCS 202 to implement the original autonomous operating mode. For example, when the original autonomous operating mode is the VS mode, the automated evasion management process 300 may log, store, or otherwise maintain the vertical speed setting being utilized for the VS mode and the aircraft's attitude with respect to the altitude target prior to the RA issued by the TCAS 120, 206.

After identifying and recording the original autonomous operating mode and mode settings that were active at the time a collision avoidance indication was provided by a collision avoidance system, the automated evasion management process 300 automatically activates the autonomous collision avoidance mode to autonomously perform an evasive maneuver in accordance with the collision avoidance indication (task 304). For example, after logging the original autonomous operating mode and mode settings, the FCS 202 and/or the flight director 210 may automatically activate the AP TCAS autonomous operating mode using parameter values provided by the TCAS 120, 206 or otherwise determined based on the RA provided by the TCAS 120, 206. In this regard, the flight director 210 effectively suspends the previous autonomous operating mode and begins autonomously commanding the autopilot 212 and thrust manager 214 to regulate the vertical speed and/or flight path angle in accordance with the RA provided by the TCAS 120, 206 independent of the previously-determined vertical profile.

While autonomously operating the aircraft in the autonomous collision avoidance mode, the automated evasion management process 300 continually analyzes the current state of the aircraft and applies mode reentry logic associated with the original autonomous operating mode to dynamically determine whether the original autonomous operating mode is available for reentry based on the relationship between the current, real-time status of the aircraft and the original autonomous operating mode settings (tasks 306, 308). In this regard, the automated evasion management process 300 obtains (e.g., from the navigation system 114) the current location of the aircraft 102, the current altitude of the aircraft 102, the current configuration of the aircraft 102, the current phase of flight, and/or the like from one or more onboard systems 114, 116, 118 and applies logic specific to the preceding autonomous operating mode to determine whether or not the preceding autonomous operating mode is available for reentry upon exiting the AP TCAS autonomous operating mode. The mode reentry logic may be configured to ensure that the current aircraft state is logically and/or functionally consistent with the preceding autonomous operating mode, for example, by verifying the preceding autonomous operating mode is consistent with the current phase of flight, verifying the current aircraft altitude is consistent with one or more altitude constraints associated with the preceding autonomous operating mode, and/or the like. Additionally, the mode reentry logic may verify that one or more initial settings associated with the preceding autonomous operating mode does not conflict with the collision avoidance maneuver indicated by the RA provided by the TCAS 120, 206 to ensure reentering the preceding autonomous operating mode may not trigger a subsequent collision avoidance maneuver.

When the original autonomous operating mode is available, the automated evasion management process 300 identifies or otherwise selects the original autonomous operating mode as the destination operating mode for entry after the collision avoidance maneuver upon termination of the autonomous collision avoidance mode (task 310). The automated evasion management process 300 also generates or otherwise provides a graphical indication that the original autonomous operating mode is designated as the destination operating mode for transitioning from the autonomous collision avoidance mode (task 312). In this manner, the automated evasion management process 300 provides guidance that conveys the expected automation behavior to the pilot to provide awareness of how the autonomous operation of the aircraft 102 is likely to proceed upon deactivation of the AP TCAS mode.

When the original autonomous operating mode is not viable based on the current aircraft state, the automated evasion management process 300 applies mode selection logic associated with one or more alternative autonomous operating modes to dynamically determine whether an alternative autonomous operating mode is available for reentry based on the current, real-time status of the aircraft (tasks 314, 316). In this regard, the automated evasion management process 300 applies a different set of mode reentry logic rules and/or criteria to the current aircraft state to verify whether an alternative autonomous operating mode is viable for entry based on the current aircraft state, and the alternative mode selection and/or reentry logic may vary depending on the original autonomous operating mode (e.g., the subset of potentially available autonomous operating modes and their reentry criteria may vary depending on what the original autonomous operating mode is).

When an alternative autonomous operating mode is available, the automated evasion management process 300 selects or otherwise identifies the alternative autonomous operating mode as the destination autonomous operating mode for entry in lieu of the original autonomous operating mode upon deactivation of the autonomous collision avoidance mode (task 318) and provides a corresponding graphical indication of the alternative autonomous operating mode as the expected destination mode (task 312). In this manner, the pilot is apprised that an autonomous operating mode different from the preceding autonomous operating mode is to be expected to be entered after the collision avoidance maneuver is completed. On the other hand, when an alternative autonomous operating mode is unavailable based on the current aircraft state, the automated evasion management process 300 identifies a default operating mode as the destination autonomous operating mode for entry upon deactivation of the autonomous collision avoidance mode (task 320).

Still referring to FIG. 3, in exemplary embodiments, the automated evasion management process 300 continually monitors or otherwise analyzes the output of the collision avoidance system to identify or otherwise determine when the autonomous collision avoidance mode should be deactivated (task 322). For example, the AP TCAS mode may be activated and maintained active as long as a corrective RA is output or provided by the TCAS 120, 206. Thereafter, when the TCAS 120, 206 provides a clear of conflict indicia or a preventative RA, the FCS 202 and/or flight director 210 may automatically deactivate the AP TCAS mode and transition to the destination operating mode selected by the automated evasion management process 300. In this regard, in exemplary embodiments, the loop defined by tasks 306, 308, 310, 312, 314, 316, 318, 320 and 322 repeats continually while autonomously operating in the autonomous collision avoidance mode to dynamically determine which autonomous operating mode will be available and designated for entry and provide corresponding indicia to the pilot in real-time in response to changes to the aircraft status. Thus, as the aircraft status changes during execution of an evasive maneuver in a way that may violate one or more constraints or criteria associated with the original autonomous operating mode or otherwise be inconsistent with the original autonomous operating mode, the automated evasion management process 300 may dynamically update the identified destination operating mode in real-time to notify the pilot that the automation behavior is expected to change after the evasive maneuver. If the aircraft status changes so that the original autonomous operating mode becomes available, the automated evasion management process 300 dynamically updates the identified destination operating mode in real-time to notify the pilot accordingly.

When the autonomous collision avoidance mode is deactivated, the automated evasion management process 300 automatically initializes or otherwise configures one or more parameters or settings of the destination operating mode and then automatically activates the destination operating mode for execution using those settings (tasks 324, 326). In exemplary embodiments, the automated evasion management process 300 utilizes one or more stored or recorded parameter values from the original autonomous operating mode settings prior to entering the autonomous collision avoidance mode to initialize or configure the destination operating mode. For example, one or more flight path targets (e.g., altitude targets, vertical speed targets, flight path angle targets, and/or the like) that were previously configured and activated for the original autonomous operating mode prior to entering the AP TCAS mode may be utilized to provide corresponding flight path targets for the destination operating mode or otherwise populate one or more parameters for the destination operating mode. In this regard, the automated evasion management process 300 may configure destination operating mode to better emulate the previous autonomous operation behavior prior to the collision avoidance maneuver, thereby achieving a more predictable or consistent automation behavior across operating modes. Additionally, or alternatively, the automated evasion management process 300 may utilize one or more default values to configure the destination operating mode, for example, when the destination operating mode requires a value for a particular parameter that was not utilized by the original autonomous operating mode. Once the destination operating mode is configured, the FCS 202 and/or the flight director 210 automatically initiates or otherwise implements the destination operating mode to autonomously command, control or otherwise instruct the autopilot 212 and thrust manager 214, and thereby, autonomously operate the aircraft 102.

While the subject matter described herein is not limited to any particular number, type, or combination of autonomous operating modes, for purposes of explanation, the automated evasion management process 300 will be described in the context of the original autonomous operating mode being realized as a VNAV autonomous operating mode where the FCS 202 and/or the flight director 210 is autonomously operating the aircraft 102 using a vertical profile provided by the FMS 116, 204 prior to performing an automated evasive maneuver in response to the output from the TCAS 120, 206. In this regard, prior to entering the AP TCAS mode, the FMS 116, 204 calculates or otherwise determines a vertical profile, speed profile, and a lateral trajectory (or path) for the aircraft 102 to fly and satisfy applicable constraints (e.g., altitude, speed, arrival time, etc.) based on the current flight plan and other factors (e.g., aircraft performance, environmental factors, etc.). While in the VNAV mode, the flight director 210 receives mode selections or other commands from the FMS 116, 204, which, in turn, are utilized to generate corresponding commands for the autopilot 212. In this regard, the FMS 116, 204 requests a particular autonomous operating mode supported by the FCS 118, 202 and/or flight director 210 and provides the FCS 118, 202 and/or flight director 210 with appropriate flight path targets so that the autonomous operating mode tracks or otherwise follows the optimal vertical profile computed by the FMS 116, 204.

In response to a corrective RA output by the TCAS 120, 206, the automated evasion management process 300 (which may be executed at any one of the processing system 108, the FMS 116, 204 or the FCS 118, 202 or distributed across the FMS 116, 204 or the FCS 118, 202) identifies the VNAV mode as the original autonomous operating mode and logs or otherwise records one or more flight path targets or other parameter values or settings associated with the VNAV mode (e.g., task 302) prior to activating the AP TCAS mode. The FCS 202 and/or flight director 210 automatically activates the AP TCAS mode to autonomously operate the aircraft 102 and perform an evasive maneuver in an automated manner. In the AP TCAS mode, the flight director 210 analyzes the corrective RA to determine a corresponding vertical speed target and then commands, instructs or otherwise operates the autopilot 212 and thrust manager 214 to achieve the vertical speed target corresponding to the corrective RA, and thereby perform the recommended evasive maneuver. Examples of how an AP TCAS mode can be implemented are described in greater detail in U.S. Patent Application Publication No. 2019/0114932.

While in the AP TCAS mode, the automated evasion management process 300 continually analyzes the current aircraft state substantially in real-time to identify what autonomous operating mode may be available for reentry upon exiting the AP TCAS mode and provides corresponding indicia to the pilot. In this regard, the automated evasion management process 300 applies reentry logic associated with the VNAV mode to determine whether or not the VNAV mode is available for reentry (e.g., tasks 306, 308). In one or more embodiments, in order to reenter the VNAV mode, the automated evasion management process 300 verifies that the aircraft is in a flight phase that allows the VNAV mode to be reinitiated. For example, in some embodiments, reentry into the VNAV mode may be restricted from availability for certain flight phases, such as approach or takeoff flight phases.

After verifying the current flight phase allows for the VNAV mode to be reentered, the automated evasion management process 300 verifies that the next upcoming altitude target or constraint does not conflict with an active RA. For example, if the TCAS 120, 206 outputs a preventive RA that requires the aircraft 102 maintain or otherwise utilize a certain vertical speed to climb from the current aircraft altitude and an upcoming altitude constraint is an AT or AT OR ABOVE constraint for an altitude that is above the current aircraft altitude, the automated evasion management process 300 determines the VNAV mode is available because increasing the current vertical speed to meet the constraint would not conflict with the RA. On the other hand, if the preventive RA that requires the aircraft 102 maintain the current altitude (e.g., a vertical speed equal to zero) or descend from the current altitude with a particular vertical speed, then the automated evasion management process 300 may determine the VNAV mode is not available because ascending from the current altitude to meet the constraint would conflict with the RA.

After verifying the relationship between current aircraft state and the initial VNAV mode settings are consistent with the current flight phase and that the initial VNAV mode settings are consistent with (or do not conflict with) the active RA, the automated evasion management process 300 determines that the VNAV mode is available for reentry and provides a graphical indication the VNAV mode is automatically designated as the destination operating mode upon exiting the AP TCAS mode (e.g., tasks 310, 312). In this manner, after deactivation of the AP TCAS mode, the FCS 202 and/or the flight director 210 may resume autonomous operation of the aircraft 102 to achieve or otherwise satisfy the same upcoming constraints or targets that the VNAV mode was attempting to satisfy prior to activation of the AP TCAS mode, albeit with a different flight path angle, speed profile, and/or the like that reflects the updated vertical profile, updated speed profile, and/or the like relative to the vertical profile, speed profile, and/or the like that were initially output by the FMS 116, 204 and previously being flown in connection with the initial engagement of the VNAV mode.

However, depending on the nature of the RA provided by the TCAS 120, 206, the initial VNAV mode settings may be inconsistent with (or in conflict with) the active RA, or the timing of the RA with respect to the flight plan may cause the flight phase to change while the AP TCAS mode is active. In this scenario, the VNAV mode reentry logic applied by the automated evasion management process 300 causes the automated evasion management process 300 to determine that the original VNAV mode is unavailable. In some embodiments, the automated evasion management process 300 may apply alternative VNAV mode selection logic to select or otherwise identify whether an alternative autonomous operating mode is available for use (e.g., tasks 314, 316). In other embodiments, when the VNAV mode is unavailable for reentry, the automated evasion management process 300 identifies the VS mode as the default autonomous operating mode for entry after having previously been in the VNAV mode prior to the AP TCAS mode (task 320), and upon deactivation of the AP TCAS mode, the automated evasion management process 300 may initialize the VS mode with a default vertical speed target (e.g., a vertical speed of zero).

As described above, the automated evasion management process 300 dynamically updates the destination operating mode while in the AP TCAS mode, such that the graphically indicated or annunciated destination operating mode may vary in real-time based on the aircraft state. Thus, the pilot is apprised in real-time of the automation behavior to be expected upon termination of the AP TCAS mode, and whether or not pilot action may be required to achieve the desired operating mode upon completion of the evasive maneuver. For example, if the pilot wants to resume VNAV mode and the VNAV mode is indicated, the pilot can discern that VNAV will automatically reengage, and as such, maintain situational awareness and focus on other aspects of operating the aircraft upon AP TCAS deactivation. Conversely, if another mode is indicated, the pilot is provided with awareness that pilot action will be required to restore the VNAV mode, and as such, the pilot may respond more quickly to the AP TCAS mode deactivation to achieve the desired aircraft behavior.

As another example, when the VS mode is active for climbing to an altitude target of 10,000 feet at a 2000 feet per minute vertical speed, in response to a corrective RA output by the TCAS 120, 206 to reduce climbing to 1000 feet per minute, the automated evasion management process 300 identifies the VS mode as the original autonomous operating mode and logs or otherwise records the 10,000 foot altitude target and 2000 feet per minute vertical speed target prior to activating the AP TCAS mode (tasks 302, 304). While in the AP TCAS mode, aircraft climbs at 1000 feet per minute, and the automated evasion management process 300 continually analyzes the current aircraft state substantially in real-time to identify whether the VS mode is available for reentry upon exiting the AP TCAS mode and provides corresponding indicia to the pilot (tasks 306, 308). In this regard, while the aircraft altitude is below the 10,000 foot altitude target, the VS mode remains available for reentry and is annunciated to the pilot. Once the aircraft altitude exceeds the 10,000 foot altitude target for the VS mode, the automated evasion management process 300 identifies the VS mode as no longer viable due to the inconsistency between the climbing vertical speed target and the current aircraft altitude above the altitude target, identifies the flight level change (FLCH) mode as the alternative autonomous operating mode is available for use, and dynamically updates the display to graphically indicate the FLCH mode (or speed on elevator mode) as the new destination operating mode in lieu of the VS mode (tasks 314, 316, 318). Thereafter, once the AP TCAS mode deactivates, the automated evasion management process 300 automatically activates the FLCH mode using the current altitude target (e.g., 10,000 feet) to autonomously descend to the altitude target in accordance with the FLCH mode (e.g., by reducing power to idle and pitching the aircraft down to maintain speed constant) rather than returning to the VS mode.

As another example, when an altitude hold (ALT) mode is active, in response to a corrective RA output by the TCAS 120, 206, the automated evasion management process 300 identifies the ALT mode as the original autonomous operating mode prior to activating the AP TCAS mode (tasks 302, 304). While in the AP TCAS mode, when the aircraft deviates from the original altitude target, the automated evasion management process 300 identifies the ALT mode as no longer viable due to the altitude difference, identifies the FLCH mode as the alternative autonomous operating mode is available for use in resolving the altitude difference, and dynamically updates the display to graphically indicate the FLCH mode (or speed on elevator mode) as the new destination operating mode in lieu of the ALT mode (tasks 314, 316, 318). Thereafter, once the AP TCAS mode deactivates, the automated evasion management process 300 automatically activates the FLCH mode using the current altitude target to autonomously ascent or descend to the current altitude target in accordance with the FLCH mode after performing the collision avoidance maneuver.

Figure 4:
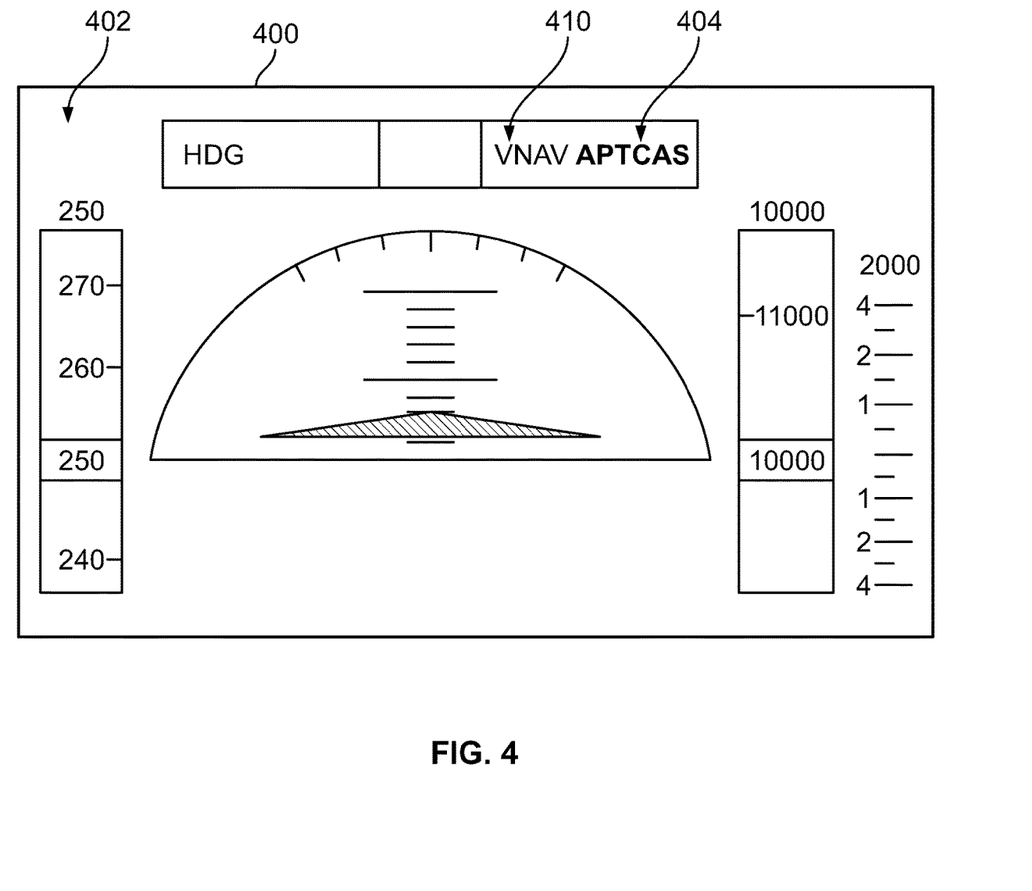
FIG. 4 depicts an exemplary flight deck display including graphical indicia of a destination autonomous operating mode in connection with the automated evasion management process of FIG. 3 in accordance with one or more embodiments.

Referring now to FIG. 4, with continued reference to FIGS. 1-3, the processing system 108 and the display system 110 are cooperatively configured to control the rendering of a flight deck display 400 on the display device 104 and provide graphical indicia 410 of a destination autonomous operating mode for entry after termination of an automated collision avoidance mode on the flight deck display 400. The illustrated flight deck display 400 includes a primary flight display 402 capable of being utilized by a pilot or other user for guidance with respect to manually flying the aircraft 102, that is, the pilot's primary reference for flight information (e.g., speed and altitude indicia, attitude indicia, lateral and vertical deviation indicia, mode annunciations, and the like). It should be appreciated that flight deck display 400 as depicted in FIG. 4 represents the state of a dynamic display frozen at one particular time, and that the flight deck display 400 may be continuously refreshed during operation as the aircraft 102 travels to reflect changes in the attitude, altitude and/or position of the aircraft 102 with respect to the earth. In this regard, the primary flight display 402 includes one or more graphical attitude indicia that convey the current attitude of the aircraft 102, along with other features that may be graphically rendered, including, without limitation an airspeed indicator (or airspeed tape) that indicates the current airspeed of the aircraft 102, an altitude indicator (or altimeter tape) that indicates the current altitude of the aircraft 102, a zero pitch reference line, a pitch ladder scale, a compass, a roll scale, and the like. While the automated collision avoidance mode is active, the primary flight display 402 may also include graphical indicia of the collision avoidance maneuver output or otherwise recommended by the collision avoidance system 120. For the sake of clarity, simplicity, and brevity, the conventional graphical elements of the primary flight display 402 will not be described herein.

In the illustrated embodiment, when the AP TCAS mode is activated, a graphical indication 404 of the AP TCAS mode as being activated is rendered or otherwise displayed on or overlying the primary flight display 402, for example, at or along the upper border or edge of the primary flight display 402. In exemplary embodiments, the graphical indication 410 of the destination autonomous operating mode is positioned adjacent to the AP TCAS mode indication 404, with the AP TCAS mode indication 404 being rendered using one or more visually distinguishable characteristics that emphasize the AP TCAS mode as being active relative to the destination autonomous operating mode. As described above, the destination mode indication 410 may dynamically update and vary during the AP TCAS mode in response to changes in the current aircraft state relative to one or more flight path targets associated with the original autonomous operating mode. For example, while the destination mode indication 410 indicates the VNAV mode as the current destination operating mode, if the aircraft state resulting from the AP TCAS mode becomes inconsistent with one or more prior VNAV flight path targets, the destination mode indication 410 may be dynamically updated to indicate the default autonomous operating mode in lieu of the VNAV mode.

Figure 5:
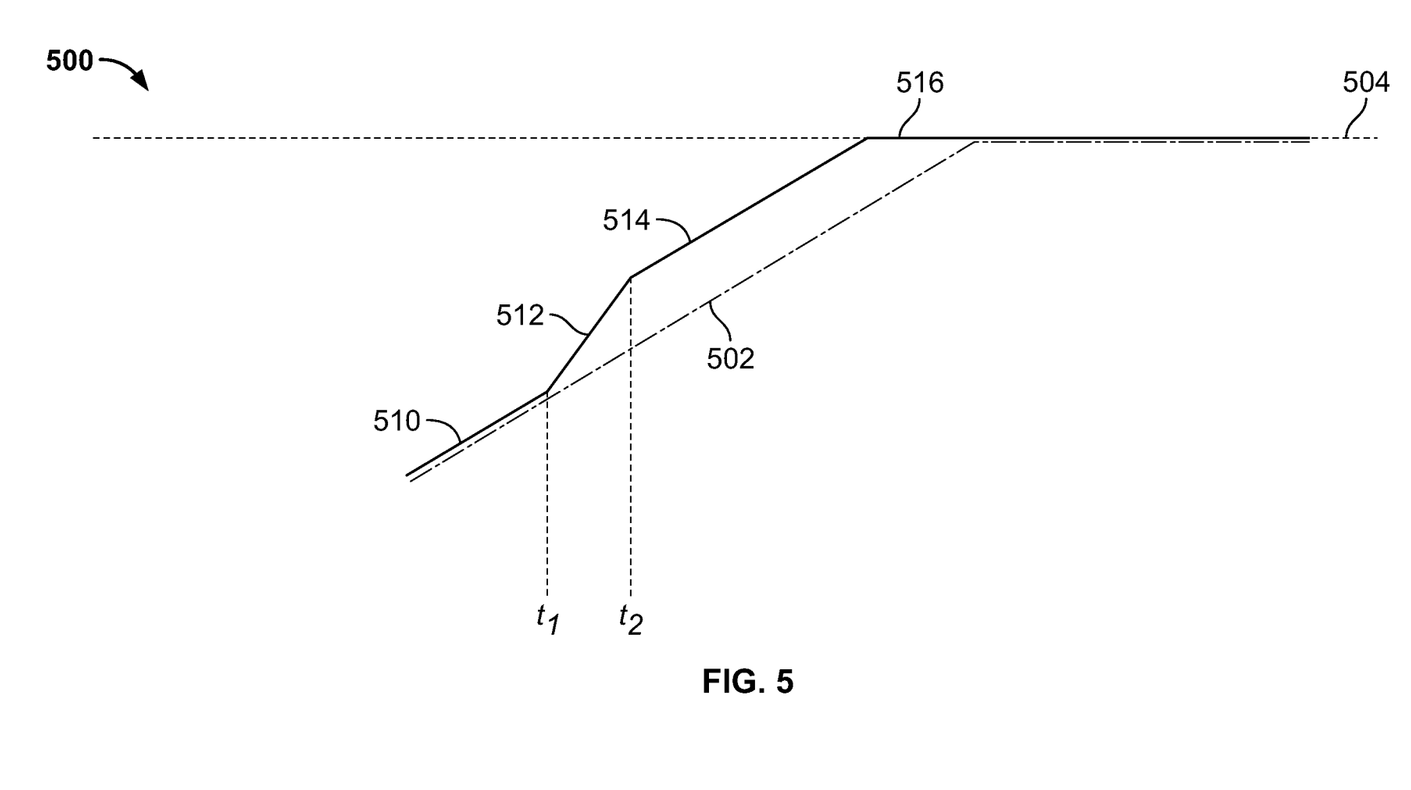
FIGS. 5-6 depict exemplary vertical profiles depicting the automation behavior resulting from the automated evasion management process of FIG. 3 in one or more exemplary embodiments.

FIG. 5 depicts a graphical representation of a vertical profile 500 that may be autonomously flown by an aircraft in accordance with the automated evasion management process 300 in accordance with one or more embodiments. In this regard, FIG. 5 depicts a scenario where the aircraft is initially climbing in a VNAV FLCH mode along a segment 510 with a speed target configured to track an optimal trajectory 502 previously-computed by the FMS en route to an altitude target 504. In response to a corrective RA to climb at an increased vertical speed at time $t_1$, the AP TCAS mode is activated, resulting in the aircraft deviating from the optimal trajectory 502 along segment 512, for example, by the FCS 202 enabling commands from the collision avoidance system 206 or entering a VS mode using the vertical speed target commanded by the collision avoidance system 206. As described above, the automated evasion management process 300 records the original altitude target 504. When the AP TCAS mode is deactivated at time $t_2$ (e.g., in response to removal of the corrective RA or a clear of conflict indicia by the collision avoidance system 120), the automated evasion management process 300 determines that the current aircraft altitude at time $t_2$ is consistent with the active preventative RA and automatically reinitiates the VNAV FLCH mode using the speed target and current altitude target 504 from the original VNAV FLCH mode to continue along segment 514 in the VNAV FLCH mode in accordance with the speed target previously-computed by the FMS 116, 204 until reaching the current altitude target 504, at which point the FMS 116, 204 requests or otherwise commands the FCS 202 and/or flight director 210 to enter the ALT mode using the current altitude target.

Figure 6:
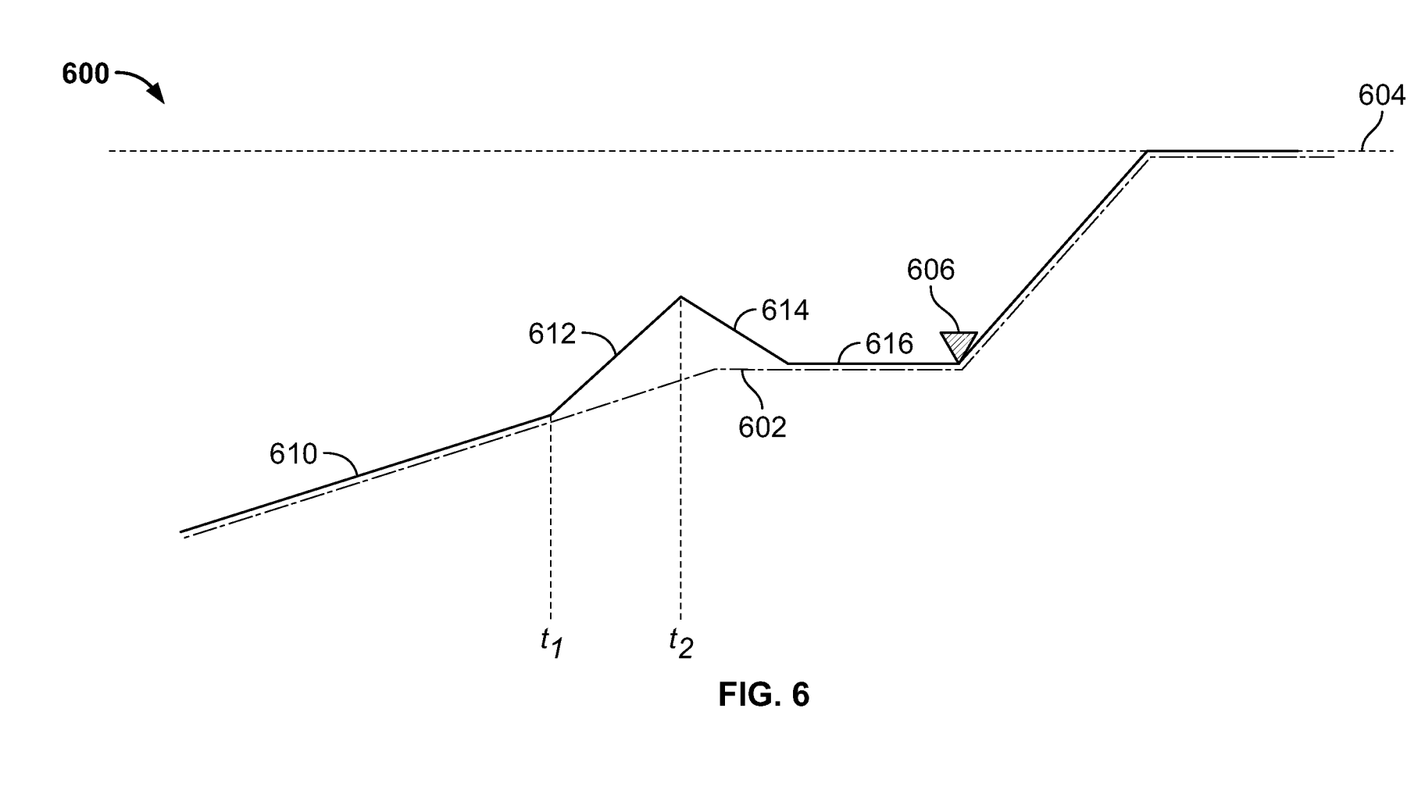

FIG. 6 depicts a graphical representation of a vertical profile 600 that may be autonomously flown by an aircraft in accordance with the automated evasion management process 300 in a scenario where the FMS computes an updated vertical profile to be utilized for a VNAV mode upon reinitiation in response to deactivation of the AP TCAS mode after performing an automated collision avoidance maneuver. In this regard, FIG. 6 depicts a scenario where the aircraft is initially climbing in a VNAV FLCH mode along a segment 610 with a vertical speed target configured to track an optimal climbing trajectory 602 previously-computed by the FMS en route to an altitude target 604 that satisfies an AT OR BELOW altitude constraint 606. In response to a corrective RA to climb at an increased vertical speed at time $t_1$, the AP TCAS mode is activated, resulting in the aircraft deviating from the optimal climbing trajectory 602 along segment 612, for example, by the FCS 202 enabling commands from the collision avoidance system 206 or entering a VS mode using the vertical speed target commanded by the collision avoidance system 206. As described above, the automated evasion management process 300 records the AT OR BELOW altitude constraint 606 from the original VNAV FLCH mode. When the AP TCAS mode is deactivated at time $t_2$ (e.g., in response to removal of the corrective RA or a clear of conflict indicia by the collision avoidance system 120), the automated evasion management process 300 determines that the current aircraft altitude at time $t_2$ is above the altitude constraint 606, the FMS 116, 204 determines an updated vertical profile for the autonomous operating mode based on the relationship between the current aircraft altitude and the altitude constraint. Thereafter, the aircraft proceeds along segment 614 by descending in the VNAV FLCH mode using the altitude of the upcoming constraint 606 as an altitude target until reaching the constraining altitude, at which point the FMS 116, 204 requests or otherwise commands the FCS 202 and/or flight director 210 to enter the ALT mode to satisfy the AT OR BELOW constraint 606 before resuming climbing in accordance with the original trajectory 602.

By virtue of the subject matter described herein, a pilot may be apprised of the expected autonomous operating mode and corresponding automation behavior that is likely to follow an automated evasive maneuver in real-time, thereby improving the pilot's awareness and understanding of the automation behavior. Additionally, the original autonomous operating mode may be reengaged or reactivated using one or more of the previous flight path targets or settings for that mode, thereby allowing the reengaged or reactivated instance of that autonomous operating mode to better emulate the preceding automation behavior. Automating return of the aircraft to the original trajectory may reduce flight plan deviations and the probability of future air traffic encounters while also reducing pilot workload.

For the sake of brevity, conventional techniques related to collision avoidance systems, flight management, flight controls, autopilot, autothrottle, or other automation, navigation systems, inertial reference systems, graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of autonomously operating a vehicle, the method comprising:

identifying an original autonomous operating mode and one or more initial mode settings associated with the original autonomous operating mode autonomously operating the vehicle in accordance with a vertical profile prior to entering an autonomous collision avoidance mode in response to an output from a collision avoidance system; and after entering the autonomous collision avoidance mode:

determining whether the original autonomous operating mode is viable based on a relationship between a current vehicle status and the one or more initial mode settings associated with the original autonomous operating mode, wherein determining the autonomous operating mode is viable comprises verifying a setting of the one or more initial mode settings of the autonomous operating mode does not conflict with the output from the collision avoidance system; and after deactivation of the autonomous collision avoidance mode, when the original autonomous operating mode is viable, automatically reinitiating the original autonomous operating mode to autonomously operate the vehicle in accordance with an updated vertical profile based on the current vehicle status using the one or more initial mode settings from the original autonomous operating mode prior to entering the autonomous collision avoidance mode.

2. The method of claim 1, wherein:
the one or more initial mode settings include a flight path target; and
determining whether the original autonomous operating mode is viable comprises determining the original autonomous operating mode is viable based on a relationship between the current vehicle status and the flight path target.

3. The method of claim 1, wherein:
the current vehicle status includes a current flight phase and a current aircraft altitude; and
determining the original autonomous operating mode is viable comprises determining the original autonomous operating mode is viable based on the current flight phase and a relationship between the current aircraft altitude and an altitude target.

4. The method of claim 1, further comprising providing graphical indication of the original autonomous operating mode during operation of the vehicle in the autonomous collision avoidance mode when the original autonomous operating mode is viable.

5. The method of claim 4, wherein the graphical indication dynamically updates to indicate a different autonomous operating mode in response to determining the original autonomous operating mode is not viable.

6. The method of claim 1, further comprising:
determining whether an alternative autonomous operating mode is viable based at least in part on the current vehicle status when the original autonomous operating mode is not viable; and
when the alternative autonomous operating mode is viable, automatically initializing the alternative autonomous operating mode using the one or more initial mode settings associated with the original autonomous operating mode in response to deactivation of the autonomous collision avoidance mode.

7. The method of claim 6, wherein:
the one or more initial mode settings comprise an altitude target;
the current vehicle status comprises an autothrottle engagement status; and
automatically initializing the alternative autonomous operating mode comprises initializing the alternative autonomous operating mode using the altitude target for the alternative autonomous operating mode.

8. The method of claim 1, wherein:
the vehicle comprises an aircraft;
the current vehicle status includes a current aircraft altitude; and
automatically reinitiating the original autonomous operating mode comprises:
determining the updated vertical profile for the original autonomous operating mode based on a relationship between the current aircraft altitude and an altitude constraint; and
thereafter autonomously operating the aircraft in accordance with the updated vertical profile in response to deactivation of the autonomous collision avoidance mode.

9. A non-transitory computer-readable medium having instructions stored thereon that are executable by a processing system to perform the method of claim 1.

10. A flight control method for autonomous operation of an aircraft, the method comprising:
autonomously operating, by a flight control system, the aircraft in a first autonomous operating mode autonomously operating the aircraft in accordance with a vertical profile in accordance with one or more flight path targets using one or more initial mode settings;
receiving, by the flight control system, an output from a collision avoidance system indicative of an evasive maneuver;
in response to the output, autonomously operating, by the flight control system, the aircraft in autonomous collision avoidance mode in accordance with the output from the collision avoidance system in lieu of the first autonomous operating mode;
verifying the first autonomous operating mode is viable based at least in part on a current aircraft status with respect to the one or more flight path targets while the aircraft is autonomously operated in the autonomous collision avoidance mode, wherein verifying the first autonomous operating mode is viable comprises verifying a setting of the one or more initial mode settings of the first autonomous operating mode does not conflict with the output from the collision avoidance system; and
in response to deactivation of the autonomous collision avoidance mode when the first autonomous operating mode is viable, reinitiating the first autonomous operating mode to autonomously operate the aircraft in accordance with an updated vertical profile based at least in part on the current aircraft status and the one or more flight path targets prior to the flight control system autonomously operating the aircraft in the first autonomous operating mode.

11. The method of claim 10, wherein autonomously operating the aircraft in the first autonomous operating mode comprises:
receiving, by the flight control system, the one or more flight path targets from a flight management system; and
determining, by the flight control system, one or more commands for an autopilot system based on the one or more flight path targets.

12. The method of claim 11, wherein:
reinitiating the first autonomous operating mode comprises receiving, by the flight control system, an updated flight path target from the flight management system prior to determining, by the flight control system, one or more subsequent commands for the autopilot system based on the updated flight path target; and
the updated flight path target is determined based at least in part on the current aircraft status and the one or more flight path targets.

13. The method of claim 11, wherein autonomously operating the aircraft in the autonomous collision avoidance mode comprises determining, by the flight control system, a second set of one or more commands for the autopilot system based on the output of the collision avoidance system independent of the flight management system.

14. The method of claim 10, further comprising providing graphical indication of the first autonomous operating mode as a destination operating mode for exiting the autonomous collision avoidance mode while the aircraft is autonomously operated in the autonomous collision avoidance mode when the first autonomous operating mode is viable.

15. The method of claim 14, further comprising:
determining an alternative autonomous operating mode is viable based at least in part on the current aircraft status when the first autonomous operating mode is not viable; and
providing a second graphical indication of the alternative autonomous operating mode in lieu of the graphical indication of the first autonomous operating mode while the aircraft is autonomously operated in the autonomous collision avoidance mode when the first autonomous operating mode is not viable.

16. The method of claim 15, further comprising, in response to deactivation of the autonomous collision avoidance mode when the first autonomous operating mode is not viable, autonomously operating, by the flight control system, the aircraft in accordance with the alternative autonomous operating mode using the one or more flight path targets.

17. An aircraft system comprising:
a flight management system to determine a vertical profile for an aircraft using one or more flight path targets; and
a flight control system coupled to the flight management system to autonomously operate the aircraft in accordance with the vertical profile in an original autonomous operating mode using one or more initial mode settings, autonomously operate the aircraft in accordance with an autonomous collision avoidance mode independent of the vertical profile in response to an output from a collision avoidance system, verifying a setting of the one or more initial mode settings of the original autonomous operating mode does not conflict with the output from the collision avoidance system, and thereafter, in response to deactivation of the autonomous collision avoidance mode, autonomously operate the aircraft in accordance with the original autonomous operating mode to autonomously operate the aircraft in accordance with an updated vertical profile by automatically reinitiating the original autonomous operating mode based at least in part on a current aircraft status utilizing the one or more flight path targets.

18. The aircraft system of claim 17, wherein the flight control system is configurable to record the one or more flight path targets prior to autonomously operating the aircraft in accordance with the autonomous collision avoidance mode, provide the one or more flight path targets to the flight management system in response to deactivation of the autonomous collision avoidance mode, and autonomously operate the aircraft in accordance with the original autonomous operating mode in accordance with the updated vertical profile determined by the flight management system based at least in part on the current aircraft status and the one or more flight path targets provided by the flight control system.

19. The aircraft system of claim 17, wherein the original autonomous operating mode comprises a vertical navigation (VNAV) autonomous operating mode.

* * * * *